June 28, 1949.　　　　　　R. M. BARTH　　　　　　2,474,457
BELT DISENGAGING DEVICE
Filed May 16, 1947
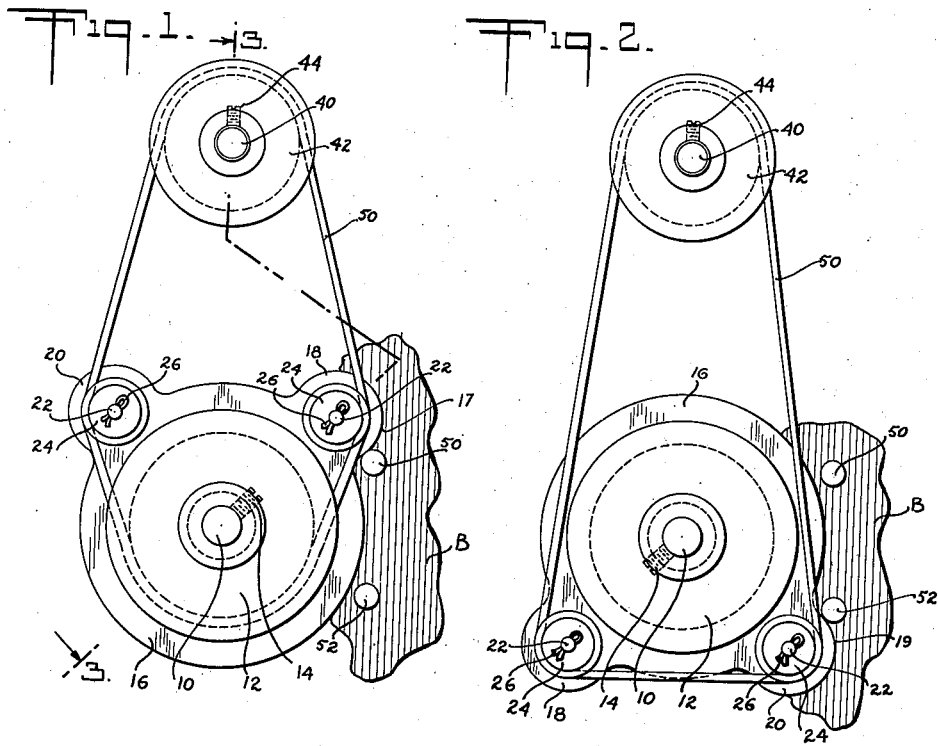
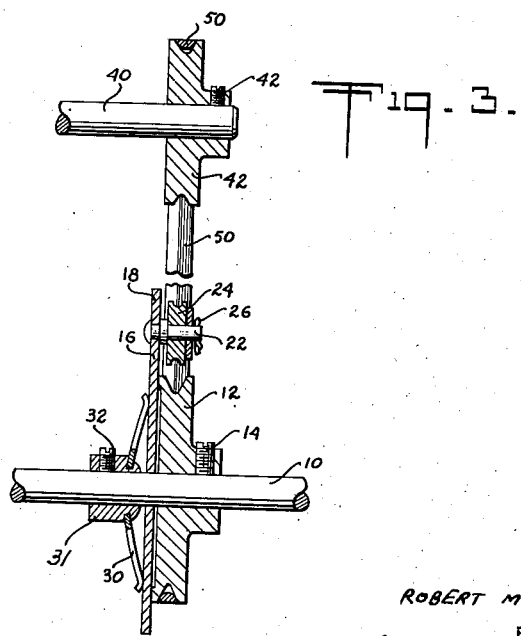
INVENTOR
ROBERT MENNING BARTH
BY
Schamies & Lieberman
ATTORNEYS Patented June 28, 1949

2,474,457

UNITED STATES PATENT OFFICE 2,474,457

BELT DISENGAGING DEVICE

Robert Menning Barth, Bronxville, N. Y., assignor to The FR Corporation, New York, N. Y., a corporation of New York Application May 16, 1947, Serial No. 748,585

7 Claims. (Cl. 74—216.5)

My invention relates generally to a belt disengaging device or clutch mechanism, and in particular it relates to a belt disengaging device for use in belt-actuated power transmitting devices. While my invention has many uses and applications, and will be described generally hereinbelow, it is particularly useful in rewind devices for motion picture film operation. It is to be understood, of course, that my invention is to be limited only by the scope of the claims annexed hereto.

The main object of my invention is the provision, in a device having a drive pulley and a driven pulley and an endless belt connection between the two, of means for automatically disengaging the belt from the driven pulley on the reversal of drive direction.

Another object of my invention is the provision, in a device having a drive shaft and pulley thereon and a driven shaft and pulley thereon and an endless belt connection between the pulleys, of means normally spring urged against the drive pulley to disengage automatically the belt from the drive pulley on reversal of drive direction.

Another object of my invention is the provision, in a device having a drive shaft and pulley thereon and a driven shaft and pulley thereon and an endless belt connection between the two, a disc on the drive shaft and means to spring-urge same normally against and in friction engagement with the drive pulley, the disc being operable on reversal of the direction of drive shaft to disengage the belt from the drive pulley.

Another object of my invention is the provision of a disc in a device as above described of a pair of spaced wing members on the disc having idler rollers thereon normally engaging the belt between the drive pulley and the driven pulley, the said idler rollers distending the belt on reversal of drive direction to disengage same from the drive pulley.

Other and further objects of my invention will in part be obvious and still others specifically recited in the following description of an illustrative embodiment thereof.

In the drawings annexed hereto and forming a part hereof,

Figure 1 is an elevational view of one form of device constructed according to and embodying my invention, with the parts shown in engaged position;

Fig. 2 is a similar view thereof, with the driven shaft shown in disengaged position; and Fig. 3 is a section on the line 3—3 of Fig. 1.

My device comprises a support member B on which is mounted a drive shaft 10 on which is fixed, for rotation therewith, a peripherally notched pulley wheel 12, as by means of set screw 14 or otherwise. A flat circular disc 16 is threaded on shaft 10 adjacent pulley wheel 12. Disc 16 is not fixed onto or otherwise rotatable with wheel 12 except as will be described below. A pair of wing portions 18, 20 are formed on disc 16, extending outwardly therefrom and spaced apart about 90° of the disc. It will be seen that the linear distance between wings 18, 20 is greater than the diameter of drive pulley 12. Each wing has a pin 22, 22 fixed thereon and extending outwardly therefrom, on which pins idler rollers as 24, 24 are mounted, as by cotter pins 26, 26 or otherwise. Rollers 24, 24 are also peripherally grooved, and are mounted on shafts or pins 22, 22 as to rotate in the same plane as wheel 12. A spring washer 30 is mounted on shaft 10 in a suitable socket 31 secured on shaft 10 as by set screw 32, the spring normally bearing and exerting pressure on disc 16 as to urge it towards and against pulley wheel 12.

A driven shaft as 40 is also mounted on support B, having a driven pulley wheel 42 fixed on said shaft 40 for rotation therewith, as by means of a set screw 44 or otherwise. Wheel 42 is also peripherally grooved and is aligned with drive pulley wheel 12 and the idler rollers 24, 24. An endless belt of extensible material as leather, rubber, composition material, coiled spring, etc. is mounted about the drive and driven pulley wheels 12, 42 and also about the idler rollers 24, 24.

Support structure B is provided with a pair of vertically spaced apart pins 50, 52 projecting outwardly therefrom in the path of wing portions 18, 20. Referring to Figs. 1 and 2, it will be seen that pins 50, 52 are radially arranged with respect to the center of disc 16, and mounted slightly beyond the perimeter thereof but within the arc describably by wings 18, 20 during rotation of disc 16. Both pins 50, 52 are on the same side of the structure with respect to drive shaft 10.

In operation, when drive shaft 10 and driving wheel 12 are rotated clockwisely, manually or otherwise, the friction engagement between disc 16 and driving wheel 12 caused by the normal biasing of spring 30 urging disc 16 against wheel 12, will result in rotating disc 16 clockwisely. This rotation of disc 16 will continue until the leading edge 17 of wing 18 abuts against stop-pin 50, thus positioning idler rollers 24, 24 between the drive and driven pulley wheels (as in the position of Figure 1), and directly and positively transmitting rotative power from shaft 10 and drive wheel 12 to shaft 40 and pulley wheel 42. When the rotation of drive shaft 10 and pulley wheel 12 is reversed, that is, turned counter-clockwisely, the friction grip of disc 16 against pulley 12 caused by spring 30, will result in disc 16 being swung counter-clockwisely also, until the leading edge 19 of the other wing member 20 is borne against stop 52, to position the parts as illustrated in Fig. 2 being the spaced idler on the other side of drive wheel 12, with the drive wheel between the idler rollers and the driven pulley 42. The distance between outer rollers 24, 24 is greater than the diameter of pulley wheel 12, as noted above, and positioned as they are—during counter clockwise rotation—on the side of pulley wheel 12 remote from driven wheel 42, belt 50 will be lifted thereupon out of engagement with and away from the peripheral groove in wheel 12, thereby disengaging the drive pulley and shaft from the driven pulley and shaft.

Having now described my invention, what I claim and desire to secure by Letters Patent is:

1. A device of the character described comprising a support member, a drive shaft and pulley thereon, a disc disposed about the drive shaft and associated with the drive pulley and capable of rotating therewith, a driven shaft and pulley therefor on the support in spaced relation to the drive shaft and pulley, the pulleys being in the same plane, idler rollers mounted on the disc and spaced apart thereon a distance greater than the diameter of the drive pulley, the idler rollers being in the same plane as the drive and driven pulleys, an endless belt around and engaging the drive and driven pulleys and idler rollers, rotation of the drive shaft and drive pulley in one direction rotating the disc and positioning the idler rollers between the drive and driven pulleys, and positively driving the belt to rotate the driven shaft and pulley in the same direction, and means, operable on rotation of the drive shaft and pulley in the opposite direction, to rotate the disc to position the idler rollers thereon on the side of the drive pulley remote from the driven pulley to thereby cause disengagement of the belt from the drive pulley.

2. A device of the character described comprising a support, a drive pulley thereon, a driven pulley thereon, an endless belt about and engaging the drive and driven pulleys, a disc associated with the drive pulley and capable of rotating therewith means on the disc engaging the belt, rotation of the drive pulley in one direction rotating the disc in the same direction causing a positive driving engagement between the drive and driven pulleys, rotation of the drive pulley in the opposite direction rotating the disc in the opposite direction and thereby disengaging the belt from the drive pulley.

3. A device of the character described comprising a support member, a drive shaft and pulley thereon, rotatable therewith in both directions, a driven shaft and pulley thereon, rotatable therewith in both directions, an endless belt about and engaging the drive and driven pulleys, a disc on the drive shaft spaced from the drive pulley rotatable therewith, belt engaging means on the disc spaced from the drive pulley, operable on rotation of the drive shaft and pulley in one direction to cause rotation of the disc in the same direction and a positive driving engagement between the drive and driven pulleys, rotation of the drive shaft and pulley in the opposite direction rotating the disc in the opposite direction and so positioning the said belt engaging means as to disengage the belt from the drive pulley.

4. A device of the character described comprising a support member, a drive shaft and pulley thereon, rotatable therewith in both directions, a driven pulley, an endless belt about and normally engaging the drive and driven pulleys, a disc on the drive shaft associated with and capable of rotating with the drive pulley, a pair of idler rollers on the disc normally engaging the belt, rotation of the drive shaft and pulley in one direction rotating the disc and driven shaft and pulley in the same direction, the idler rollers on the disc being spaced apart a distance greater than the diameter of the drive pulley, rotation of the drive shaft and pulley in the opposite direction, rotating the disc in the opposite direction and disengaging the belt from the drive pulley.

5. A device as in claim 4, having means on the support to limit the extent of rotation of the disc in both directions.

6. A device as in claim 4, in which the idler rollers are mounted on wing portions extending beyond the periphery of the disc, and stop means are mounted on the support against which the wings abut to limit the extent of rotation of the disc.

7. A device of the character described comprising a support, a drive pulley, a driven pulley, an endless belt engaging both the pulleys, rotation of the drive pulley in one direction actuating the belt to rotate the driven pulley in the same direction, and means associated with the drive pulley, operable on initial rotation of the drive pulley in the opposite direction, to disengage automatically the belt from the drive pulley, and wherein the means associated with the drive pulley comprise a disc mounted about the shaft and engaged with the drive pulley to rotate therewith on rotation of the latter in one direction, and ultimately to remain stationary with respect to the drive pulley after rotation of the latter in the opposite direction.

ROBERT MENNING BARTH.

REFERENCES CITED

The following references are of record in the file of this patent:

UNITED STATES PATENTS

| Number | Name | Date |
|---|---|---|
| 268,051 | Stevens | Nov. 28, 1882 |
| 367,891 | Canning | Aug. 9, 1887 |